Jan. 19, 1926.
G. REITER
EXTENSION LIMITING MEANS FOR GRASS SHEARS
Filed August 5, 1925
1,570,282
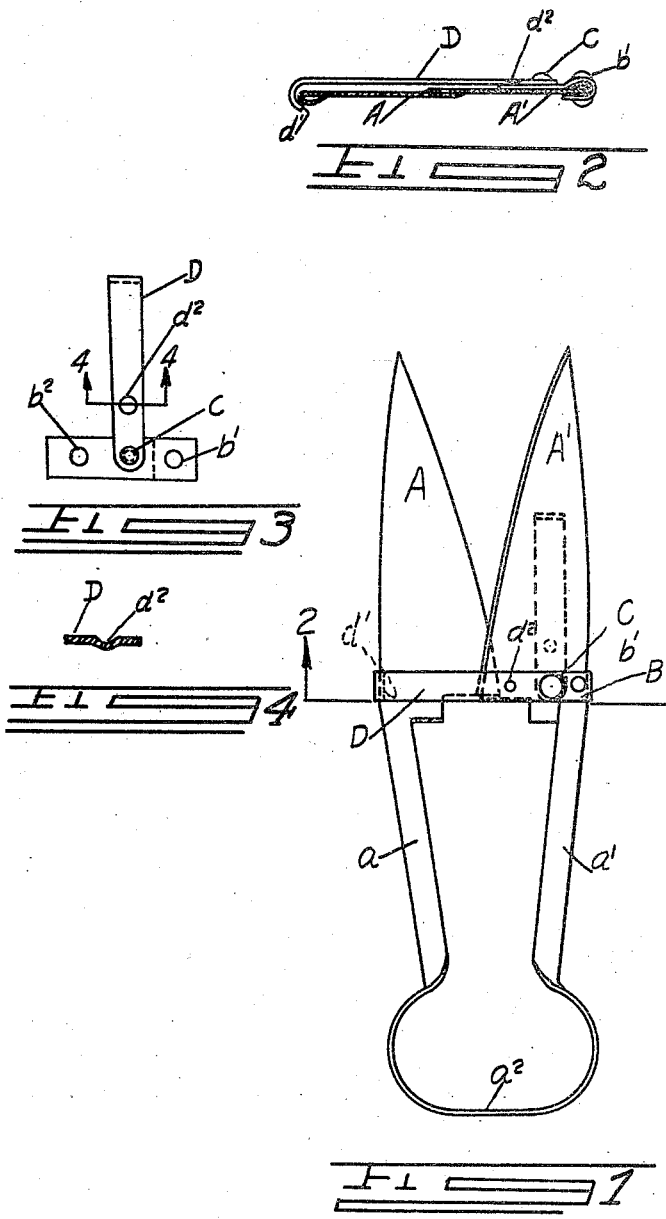
INVENTOR.
BY George Reiter
Walter A. Knight
ATTORNEY.

Patented Jan. 19, 1926.

1,570,282

UNITED STATES PATENT OFFICE.

GEORGE REITER, OF CINCINNATI, OHIO.

EXTENSION-LIMITING MEANS FOR GRASS SHEARS.

Application filed August 5, 1925. Serial No. 48,260.

*To all whom it may concern:*

Be it known that I, GEORGE REITER, a citizen of the United States, residing at Cincinnati, in the county of Hamilton and State of Ohio, have invented new and useful Improvements in Extension-Limiting Means for Grass Shears, of which the following is a specification.

My invention relates to grass shears, and more particularly to extension limiting means for same.

My improvement is adapted to prevent the blades or cutter members of the shears from slipping out of shearing contact each time they are laid down or the user releases his grip on the shanks so that the spring connection expands.

My device is so constructed that it may be positioned out of the way when the shears are not in use, so that the spring is released and there is no tension on it. If the spring is constantly under tension it will set or become weak. No prior devices have accomplished this object.

Another object of my invention is to provide an extension limiting device for shears for use on all standard shears and one that will add very little to the cost.

Another object of my invention is to provide an extension limiting device that has no parts that may become detached and lost.

The invention consists in the novel features and arrangement of parts hereinafter described and set out in the appended claims.

My invention is illustrated in the accompanying drawings, in which:

Fig. 1 is a side view of the shears,

Fig. 2 is a cross section on the line 2—2 of Fig. 1

Fig. 3 is a detail of the improvement when in out of use position, and

Fig. 4, a detail, is a cross section of Fig. 3 on the line 4—4.

Referring now to the drawings, $a$ and $a^1$ denote the shanks or handle members of the shears, A and $A^1$ the cutting blades, and $a^2$ the resilient connection.

A resilient band, which is made of two parts B and D is placed laterally over the blades A, $A^1$ near the point where they merge into shanks $a$, $a^1$. The portion of the band which is designated as B is riveted to the blade $A^1$ at $b^1$ or permanently secured in any other ordinary manner as by soldering or sweating. The other part of the band D is secured by the pivot C to the fixed element B. On the free end of the pivoted element D is a hooked clasp $d^1$ which hooks over the outer edge of the blade A and prevents such over expansion of the shears as will allow the blades to slip out of contact with each other.

A detent, composed of a depending or pressed down boss $d^2$ on the pivoted element D and a hole or corresponding recess $b^2$ (Fig. 3) on the fixed element B to receive the boss, may be provided to securely retain the element D in a straight line with the element B when the extension spring portion $a^2$ is contracted and the blades A and $A^1$ are maintained in cutting contact with each other.

After the user has finished using the shears and wishes to hang them up or put them away, he can grip the shanks and press them together so that the outer edge of the blade A is out of contact with the hooked clasp $d^1$ and then turn the pivoted element D up into the position shown by the dotted lines in Fig. 1. This will allow the spring $a^2$ to expand and prevent it from setting or becoming weak thru constant tension. No parts are removed or removable, and the extension limiting member cannot contact with the cutting edge of either blade and thus dull it.

I prefer to make the hooked clasp $d^1$ without an extended hook so that there will be no friction between the hook and the outside edge of the shear blade with which it contacts, and also so that grass will not get caught in it and clog up. The hook when properly made will simply act as an abutment or stop.

Obviously the resilient band might be made in one piece that is, the part D only, and pivoted at its fixed end to the shear blade $A^1$. As it would function precisely as with a two piece band no special illustration is thought to be necessary and it is mentioned simply because I do not wish to limit myself to the precise structure shown but conceive to be within the scope of my invention any structure readable upon the claims.

Having described my invention, what I claim as new and desire to secure by Letters Patent is:

1. In combination with a pair of shears whose blades have a resilient connection, a resilient band having a hooked clasp on its free end to contact with the outside edge of one of the shear blades, so pivoted in fixed relation to the other blade as to extend across both blades in using position and lengthwise of one blade only when in out of use position, and means for normally holding said band in using position.

2. In combination with a pair of shears whose blades have a resilient connection, a resilient band having a hooked clasp on its free end to contact with the outside edge of one of the shear blades, so pivoted in fixed relation to the other blade as to extend across both blades in using position and lengthwise of one blade only when in out of use position, and a detent tending to hold said band in using position.

3. In combination with a pair of shears, whose blades have a resilient connection, a two part band, one part fixedly secured to one of the blades of said shears, the other part pivoted to said first part and means on said pivoted part for contacting with the other blade to limit the separation of said blades.

4. In combination with a pair of shears whose blades have a resilient connection, a two part band, one part fixedly secured to one blade of said shears, the other part pivoted to said first part, a hooked clasp on said pivoted part to limit the separation of said blades, and means for normally holding the two parts of the band in alignment.

5. In combination with a pair of shears, whose blades have a resilient connection, a two part resilient band, one part fixedly secured to one blade of said shears, the other part pivoted to said first part, a hooked clasp on said pivoted part to limit the separation of said blades, and a detent on the two parts of said band tending to hold said parts in alignment when in extended position.

In testimony whereof I have hereunto set my hand.

GEORGE REITER.